(No Model.)

G. A. FULLERTON.
PASTING MACHINE.

No. 424,472. Patented Apr. 1, 1890.

Witnesses.
G. B. Maynadier
John R. Snow

Inventor.
Geo. A. Fullerton
by his attorney,
J. E. Maynadier

UNITED STATES PATENT OFFICE.

GEORGE A. FULLERTON, OF BOSTON, MASSACHUSETTS, ASSIGNOR TO GEORGE H. P. FLAGG, TRUSTEE, OF SAME PLACE.

PASTING-MACHINE.

SPECIFICATION forming part of Letters Patent No. 424,472, dated April 1, 1890.

Application filed May 15, 1884. Serial No. 131,546. (No model.)

*To all whom it may concern:*

Be it known that I, GEORGE A. FULLERTON, of Boston, in the county of Suffolk and State of Massachusetts, have invented a new and useful Pasting-Machine, of which the following is a specification, reference being had to the accompanying drawings, in which—

Figure 3:
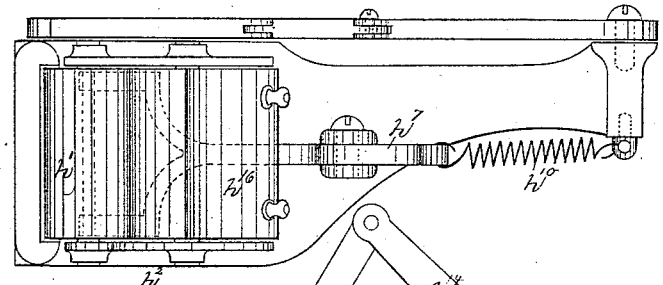
Figure 2:
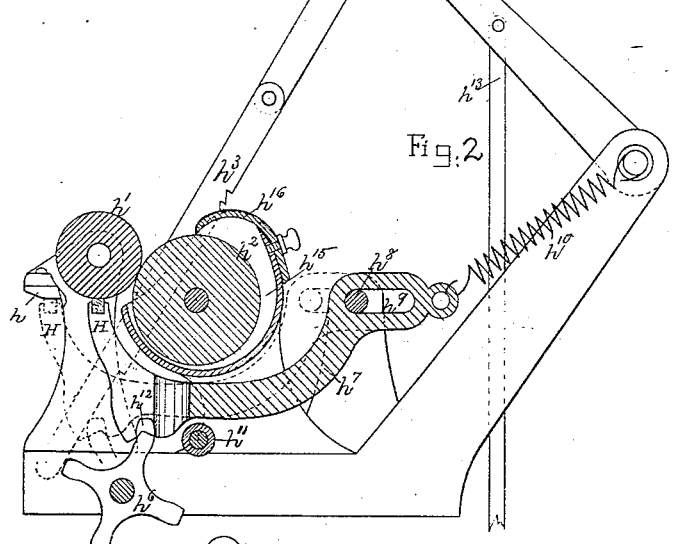
Figure 1:
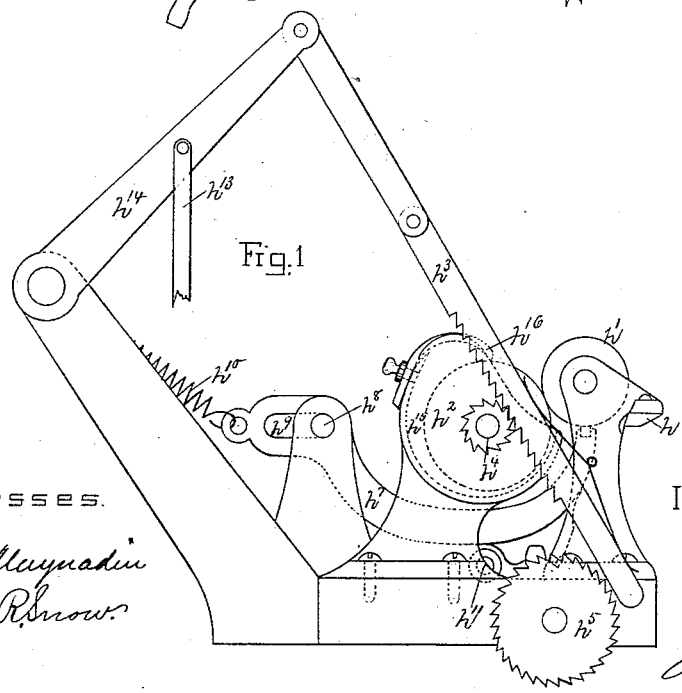

Figure 1 is an elevation, Fig. 2 a view partly in section, and Fig. 3 a plan, of my new pasting-machine.

My machine is particularly designed for use with the folding-machine set forth in my divisional application, Serial No. 221,905, filed December 17, 1886, and is specially useful for applying adhesive substance to strips of sand-paper and analogous material for cementing the ends of the strip together to form belts for abrading-machines; but my machine is also useful for many other purposes.

In the drawings I show my invention embodied in a machine which is particularly adapted for applying glue or paste to the end of a strip which is to form an abrasive belt, and the pad H is secured in one end of an arm $h^7$, (its other end being supported by a pin $h^8$ in slot $h^9$,) which is adapted to reciprocate from the receiver or roll $h'$ to the material under rest $h$, and from the material under rest $h$ to receiver $h'$, as will be clear from the following description: A spring $h^{10}$ tends to keep one end of the slot $h^9$ against the pin $h^8$ and the pad H under the roll $h'$. The arm $h^7$ rests on a roller $h^{11}$, so that the pad H is out of contact with the roll $h'$, except when raised by a tooth of the spur-gear $h^6$. A notch $h^{12}$ is made in the arm $h^7$ and allows the arm to fall when a tooth of the spur-gear comes in position to mesh with the notch.

This machine is preferably operated by a treadle connected by means of the rod $h^{13}$ to a vibrating arm $h^{14}$, to which the rack $h^3$ is pivoted. The stroke of the treadle is limited to give the proper movement to the rack $h^3$. A weight or spring returns the rack when the treadle is released. The roll $h^2$ is placed in a glue-pot $h^{15}$, and is provided with a scraper $h^{16}$ to evenly distribute and regulate the amount of glue on its surface. The roll $h'$ is in contact with and receives glue from the roll $h^2$. The end of a strip of sand-paper is placed under the rest $h$ and pushed up against the frame, by which it is squared and the extent of surface exposed to the pad is gaged. The treadle is depressed and carries down the rack, which revolves the roll $h^2$ and transfers glue to the roll $h'$. After the teeth of the rack leave the pinion $h^4$, and while the rolls are at rest, they engage with the pinion $h^5$ and cause the spur-gear to make a quarter-turn. In making the quarter-turn a tooth forces the pad against the roll $h'$, from which it falls when the tooth meshes with the notch. The tooth now meshing with the notch carries the pad from the roll $h'$ to the rest $h$ and forces the pad up against the strip below the rest $h$ as it leaves the notch and crowds past the end of the arm $h^7$. The arm falls as soon as the tooth of the spur-gear leaves it, and is drawn back to bring the pad under the roll $h'$ by means of the spring $h^{10}$. The glued end of the strip is then turned back and placed over the other end of the strip to form a loop or endless belt, and is thus made ready to be operated upon in the folding-machine set forth in my above-mentioned divisional application.

I am aware of Kellogg's patent, No. 159,582, and Liddell's patent, No. 161,133, dated March 23, 1875, and disclaim all that is shown in them.

I claim—

In a paper-pasting machine, the combination of rest $h$ and paste-receiver $h'$ with feed-arm $h^7$, provided with a pad H, rack $h^3$, pinion $h^5$, and spur-wheel $h^6$, the feed-arm $h^7$ being reciprocated from the paste-receiver $h'$ to the rest $h$ and from the rest $h$ to the paste-receiver $h'$, all substantially as and for the purpose set forth,

GEORGE A. FULLERTON.

Witnesses.
W. A. COPELAND,
J. R. SNOW.